United States Patent [19]

Agostinacci

[11] Patent Number: 4,965,941
[45] Date of Patent: Oct. 30, 1990

[54] COMBINATION MARKER AND TAPE MEASURE

[76] Inventor: Frank J. Agostinacci, 10392 NE. 12th, Bellevue, Wash. 98004

[21] Appl. No.: 443,569

[22] Filed: Nov. 29, 1989

[51] Int. Cl.⁵ ............................ G01B 3/02; G01B 3/10
[52] U.S. Cl. .......................................... 33/668; 33/760
[58] Field of Search ................. 33/668, 759, 760, 761, 33/765, 767, 768, 769, 770

[56] References Cited

U.S. PATENT DOCUMENTS

| | | | |
|---|---|---|---|
| 1,470,470 | 10/1923 | Pas . | |
| 1,613,676 | 1/1927 | Raphael . | |
| 2,624,120 | 1/1953 | Mills | 33/138 |
| 2,759,696 | 8/1956 | Nelson | 248/361 |
| 2,847,765 | 8/1958 | Bateman | 33/215 |
| 3,021,599 | 2/1962 | Odom | 33/760 |
| 3,045,788 | 7/1962 | Cederholm | 189/90 |
| 3,063,157 | 11/1962 | Keene | 33/189 |
| 3,100,941 | 8/1963 | Taylor | 33/189 |
| 3,157,950 | 11/1964 | Duncan et al. | 33/41 |
| 3,262,211 | 7/1966 | Beckett | 33/189 |
| 3,336,678 | 8/1967 | Chamberlain et al. | 33/189 |
| 3,731,389 | 5/1973 | King . | |
| 3,802,083 | 4/1974 | Freed . | |
| 4,015,337 | 4/1977 | Taylor | 33/668 |
| 4,296,554 | 10/1981 | Hammerstrom | 33/668 |
| 4,439,927 | 4/1984 | Elliott . | |
| 4,542,589 | 9/1985 | Yamamoto . | |
| 4,630,376 | 12/1986 | Pentecost | 33/668 |
| 4,729,171 | 3/1988 | Samson . | |
| 4,760,648 | 8/1988 | Doak et al. | 33/668 |

FOREIGN PATENT DOCUMENTS 2172109  10/1986  United Kingdom ................. 33/760

OTHER PUBLICATIONS

Catalog of Korea Measures Co., Ltd.

Primary Examiner—William A. Cuchlinski, Jr.
Assistant Examiner—D. Price
Attorney, Agent, or Firm—James R. Vance

[57] ABSTRACT

A combination marker and tape measure (10) having a housing (12), a flexible tape (18), and a pair of markers (104) which may be used to mark a surface on each side of the flexible tape (18). A front window cover (14) and bottom cover (16) enclose a compartment on a front surface (96) of the housing (12) to prevent exposure of the markers (104) to outside air. A plunger knob (42) is depressed into a recess (40) formed on a declining front face (38) of the housing (12) to move the markers (104) between a retracted configuration to an extended configuration. A locking mechanism (178) formed on a plunger (170) permits selective locking of the tape (18) to prevent coiling and uncoiling of the tape (18). A guide foot (154) removably mounted on an end tab (46) enables marking of a line (166) parallel to an edge (162) of a surface (164).

18 Claims, 6 Drawing Sheets

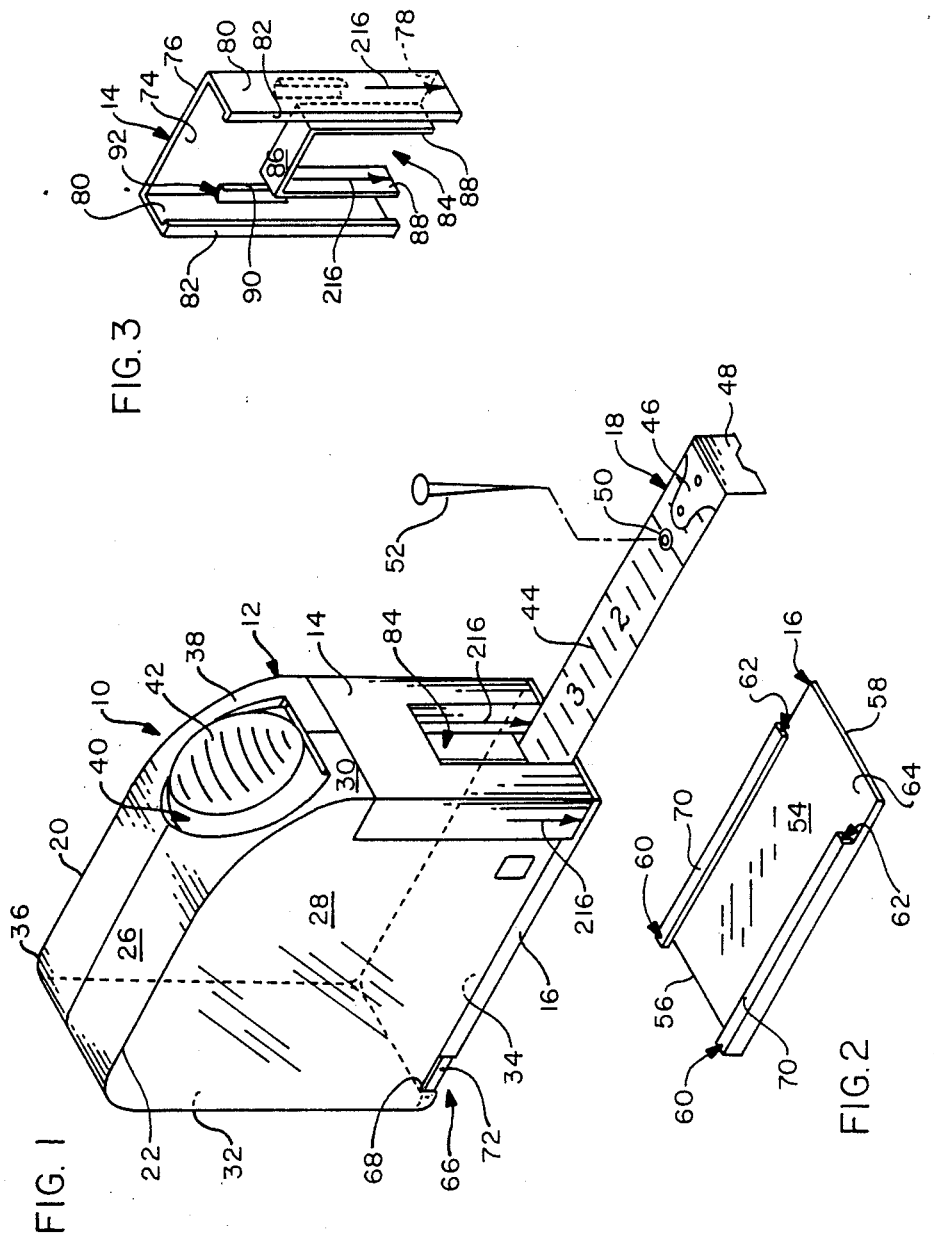

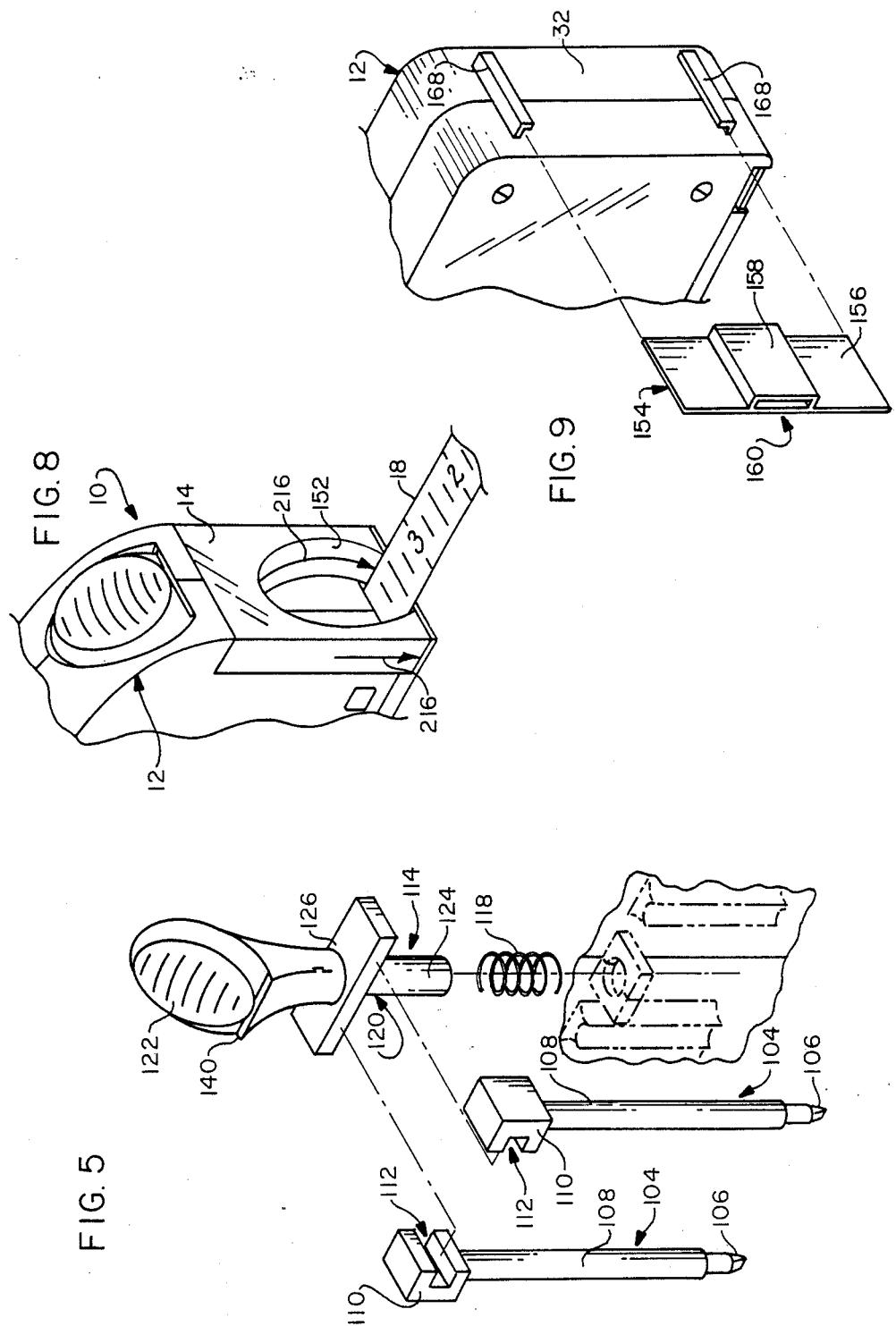

FIG. 6A
FIG. 6B
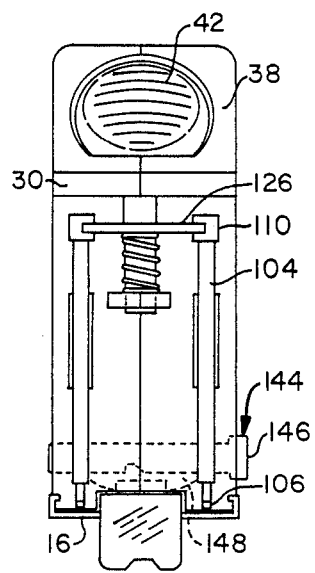
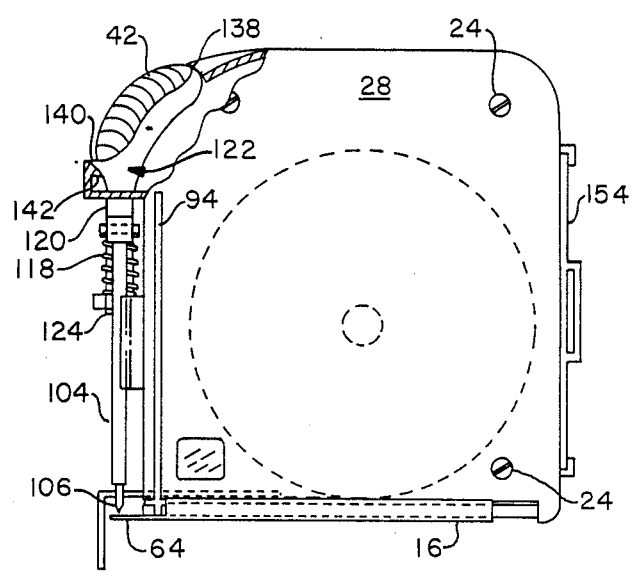
FIG. 7A
FIG. 7B
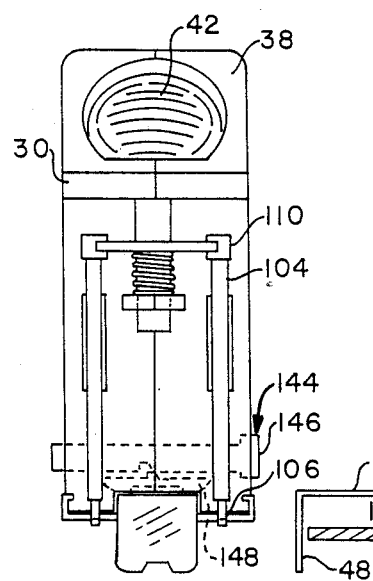
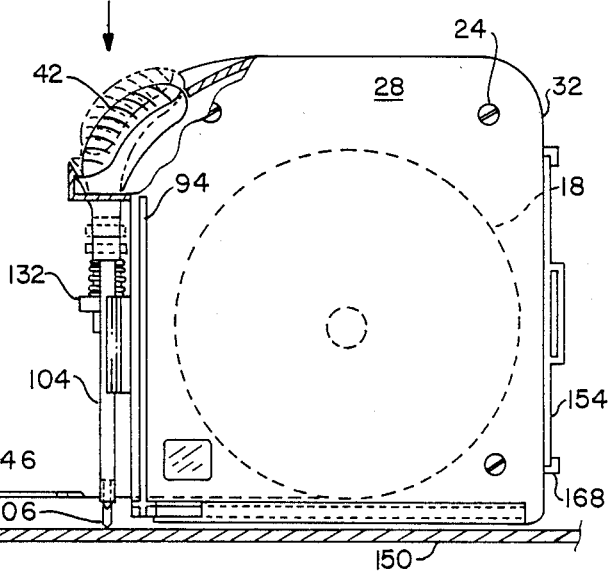

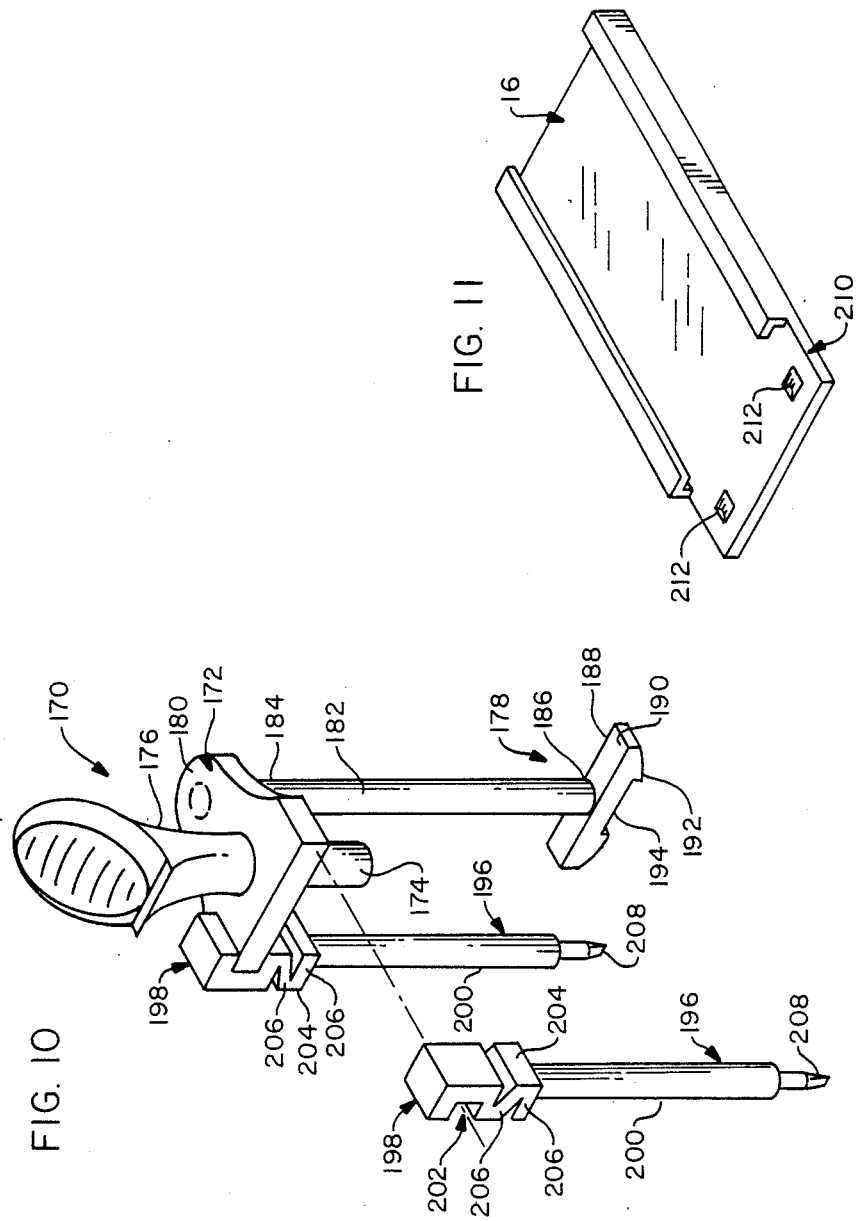

COMBINATION MARKER AND TAPE MEASURE

TECHNICAL FIELD

The present invention relates to measuring devices. More particularly, the present invention is a combination marker and tape measure having: a housing, a flexible measuring tape located within the housing, an enclosed pair of markers for marking a surface on opposite sides of the tape, and indicia located on the housing for aligning the markers to a desired measurement.

BACKGROUND ART

Tape measures typically consist of a flexible tape resiliently coiled within a housing. The tape is normally printed with incremental measuring marks for measuring distances. In use, the flexible tape is uncoiled and extended from the housing and placed on a surface to be measured. Distances can then be marked with a separate marking tool directly onto the surface.

Numerous devices have been developed for incorporating marking tools inside the tape housing to facilitate marking with one hand. For instance, Doak et al. (U.S. Pat. No. 4,760,648; issued Aug. 2, 1988) discloses a marking device that is attached to the exterior of a tape measure housing. The marking device has a marking member that is moved downwardly into contact with the article to be measured. A prong projects from the side of the marking device to indicate where the mark will be made. A disadvantage of the Doak et al. ('648) device is that the marking device protrudes from the side of the tape measure and interferes with making marks near walls and other structures associated with the surface to be marked. In addition, the marker and indicator prong tend to get caught on a user's clothing, and the indicator prong can be easily bent out of alignment with the marker. Finally, a liquid-based marking tool would tend to quickly dry out in the Doak et al. ('648) device because of being directly and continuously exposed to the atmosphere.

Another type of measuring tape is disclosed in Samson (U.S. Pat. No. 4,729,171; issued Mar. 8, 1988). The Samson ('171) device utilizes a pair of markers mounted inside the housing at the forward and rearward ends thereof. The markers retract through openings in the housing and are manually extended by buttons partially protruding from the sidewalls of the housing. One drawback to this measuring tape is the exposure of the marking tools to the atmosphere through the openings in the housing. Dirt and other foreign material can easily enter the housing through the openings and interfere with the proper functioning of the marking tools and the tape measure. The buttons are controlled from the side of the device which make it difficult to make a mark in tight quarters.

Elliott (U.S. Pat. No. 4,439,927; issued Apr. 3, 1984) discloses a tape measure having a marker, a scriber, and a braking mechanism. The braking mechanism is automatically activated when the marker or the scriber is positioned for marking the object being measured. This device has the disadvantage of tabs projecting from the sidewall that can interfere with marking near walls or other structural members associated with the marking surface. In addition, the marker is positioned on only one side of the tape, thus limiting the choices of placing the mark in a desired location. Finally, although the marker is withdrawn within the housing, it is still exposed to the outside air and foreign material through the opening in the bottom of the housing.

Other patents which reveal various measuring devices include: Pas (U.S. Pat. No. 1,470,470; issued Oct. 9, 1923); Raphael (U.S. Pat. No. 1,613,676; issued Jan. 11, 1927); Mills (U.S. Pat. No. 2,624,120; issued Jan. 6, 1953); Nelson (U.S. Pat. No. 2,759,696; issued Aug. 21, 1956); Bateman (U.S. Pat. No. 2,847,765; issued Aug. 19, 1958); Cederholm (U.S. Pat. No. 3,045,788; issued Jul. 24, 1962); Keene (U.S. Pat. No. 3,063,157; issued Nov. 13, 1962); Taylor (U.S. Pat. No. 3,100,941; issued Aug. 20, 1963); Duncan et al. (U.S. Pat. No. 3,157,950; issued Nov. 24, 1964); Beckett (U.S. Pat. No. 3,262,211; issued Jul. 26, 1966); Chamaberlain et al. (U.S. Pat. No. 3,336,678; issued Aug. 22, 1967); King (U.S. Pat. No. 3,731,389; issued May 8, 1973); Freed (U.S. Pat. No. 3,802,083; issued Apr. 9, 1974); Taylor (U.S. Pat. No. 4,015,337; issued Apr. 5, 1977); Yamamoto (U.S. Pat. No. 4,542,589; issued Sep. 24, 1985); and Pentecost (U.S. Pat. No. 4,630,376; issued Dec. 23, 1986).

The inventor believes the known prior art taken alone or in combination neither anticipate nor render obvious the present invention. These citations do not constitute an admission that such disclosures are relevant or material to the present claims. Rather, these citations relate only to the general field of the disclosure and are cited as constituting the closest art of which the inventor is aware.

DISCLOSURE OF INVENTION

The present invention is directed toward a combination marker and tape measure that protects the marking devices from drying out and has a streamlined construction that avoids protrusions from the sidewalls of the housing while facilitating marking on both sides of the tape. The tape measure also is provided with a viewing window through which the location of the marking devices may be determined with substantial precision.

The tape measure of the present invention includes a housing having: a pair of sidewalls; a front wall; a rear wall; a top wall; and a bottom wall. The housing defines an interior chamber and a compartment formed in the front wall.

A flexible tape is mounted inside the housing and is resiliently coiled and biased to retract into the interior chamber when not used. The tape may be uncoiled by pulling one end thereof outwardly from the housing. The extension of the tape automatically engages means of retracting the tape back into the interior chamber. A resilient spring may be used for this purpose. The tape includes incremental measuring marks formed thereon for measuring distances.

A pair of markers are mounted on the front wall of the housing within the compartment formed therein. One marker is located on each side of the tape. The markers are mounted to move between a retracted position, wherein each of the markers is positioned above the plane of the tape, and an extended position, wherein each of the markers projects below the plane of the tape to contact a surface upon which the tape is placed. Ideally, each pair of markers includes an integral reservoir for liquid marking material.

An actuator member is mounted on a forward edge of the top wall for manually moving each of the markers between the retracted and extended positions.

A front window cover may be removably mounted on the front wall to cover the sides and front of the markers and of the compartment.

A bottom cover may be slidably mounted on the bottom wall so that it may contact the front window cover and enclose the markers and the compartment.

In accordance with another aspect of the present invention, the markers are removably mounted on the actuator members to facilitate easy replacement.

In accordance with another aspect of the present invention, the front wall of the housing includes a pair of guides within which the markers are slidably mounted for retaining the markers in slidable engagement with the actuator member. Ideally, the front window cover further includes a pair of guides or retaining members which engage the guides on the front wall to further retain the markers in slidable engagement with the actuator member.

In accordance with still yet another aspect of the present invention, the front window cover includes indicia formed thereon for indicating the position of the markers with respect to the incremental measuring marks on the flexible tape. Such indicia may be placed on the outer sidewalls of the front window cover and/or upon the inner sidewalls of the front window cover which form the viewing window.

In accordance with a further aspect of the present invention, the front window cover is formed of transparent material to permit visual alignment of the markers with the incremental measuring marks on the flexible tape.

In accordance with yet another aspect of the present invention, the tape measure includes means for locking the flexible tape to prevent the flexible tape from coiling and uncoiling within the compartment. Ideally, the locking means is connected to the pair of markers in such a manner that when the actuator member moves the markers to the extended position, the locking means automatically engages the flexible tape to prevent the flexible tape from coiling and uncoiling.

As will be readily appreciated from the foregoing description, the combination marker and tape measure formed in accordance with the present invention has several advantages. First, the pair of markers facilitates marking on both sides of the flexible tape, thus allowing a mark to be made near the edge of a surface regardless of the orientation of the tape measure. In addition, because the slidable bottom cover selectively encloses or allows access to the marker compartment, the markers may be protected from drying out and from soiling due to contact with foreign material. Furthermore, replacement of the markers is facilitated by the removable front window cover that allows easy and convenient access to the compartment in which the markers are mounted. Finally, the streamlined housing with the absence of protrusions on the sidewalls permits the tape measure to be placed flush against a wall or other structural member extending from the surface to be marked, and thereby enable marking to be accomplished in restricted areas. Such as in or near corners.

BRIEF DESCRIPTION OF DRAWINGS

The foregoing and other features and advantages of the present invention will be more readily appreciated as the same becomes better understood from the detailed description when taken in conjunction with the following drawings, wherein:

FIG. 1 is an isometric view of the combination marker and tape measure formed in accordance with the present invention;

FIG. 2 is an isometric view of a bottom cover that is slidably received on the bottom wall of the tape measure of FIG. 1;

FIG. 3 is an isometric view of a front window cover that is removably attached to the tape measure of FIG. 1;

FIG. 5 is an exploded view of an assembly of a pair of markers and an actuator member;

FIG. 6A is a front view of the tape measure with the front window cover removed and showing the pair of markers in a retracted position;

FIG. 6B is a side view in partial cross section of the tape measure of FIG. 6A;

FIG. 7A is a front view of the tape measure formed in accordance with the present invention with the front window cover removed and showing the pair of markers in an extended position;

FIG. 7B is a side view in partial cross section of the tape measure of FIG. 7A;

FIG. 8 is an isometric view of the front portion of the tape measure illustrating an alternative embodiment of the front window cover and viewing window located therein;

FIG. 9 is an isometric view of a rear portion of the tape measure illustrating an optional storage location of an optional guide foot;

FIG. 10 is a partially-exploded isometric view of an alternative embodiment of the assembly of a pair of markers, and actuator member, further illustrating a locking member;

FIG. 11 is an isometric view of an alternative embodiment of the bottom cover;

Figure 4:
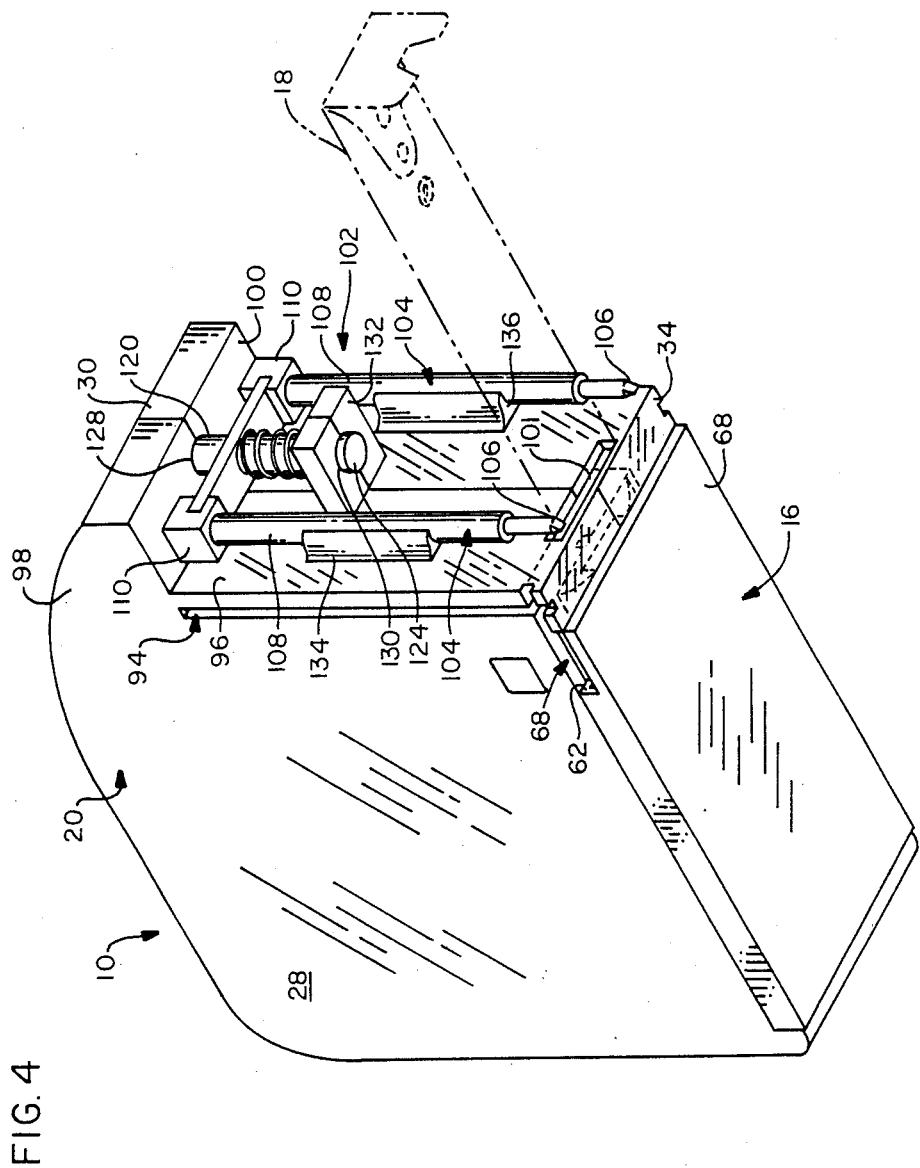
FIG. 4 is an isometric view of the tape measure of FIG. 1 having the front window cover removed to show the details of the front compartment.

One should understand the drawings are not necessarily to scale and the elements are sometimes illustrated by graphic symbols, phantom lines, diagrammatic representations, and fragmentary views. In certain instances, the inventor may have omitted details which are not necessary for an understanding of the present invention or which render other details difficult to perceive.

BEST MODE FOR CARRYING OUT THE INVENTION

Referring initially to FIG. 1, a combination marker and tape measure 10 is shown to include a housing 12, a front window cover 14 removably attached to housing 12, a bottom cover 16 slidably engaged with housing 12, and a flexible tape 18 partially uncoiled from housing 12.

Housing 12 is formed from two halves, a first half 20 and a second half 22 that are joined together by fasteners 24 (shown in FIGS. 6B and 7B). Housing 12 has a top wall 26, a pair of opposed sidewalls 28, a front wall 30, a rear wall 32, and a bottom wall 34.

Top wall 26 may have a rounded corner 36 at its intersection with rear wall 32. In addition, top wall 26 may meet front wall 30 with a large-radius curvature to form a declining front face 38. Declining front face 38 has a recess 40 formed therein within which is mounted a plunger knob 42. Plunger knob 42 is associated with an actuator assembly 114, as described more fully below.

Flexible tape 18 is readily commercially available and will not be described in detail here. Briefly, however, tape 18 is resiliently coiled within housing 12 and is biased to retract within housing 12 and may be uncoiled and withdrawn therefrom. Tape 18 includes incremental measuring marks 44 for measuring distances. An end tab 46 is formed on the end of tape 18 and includes a protruding lip 48 for gripping the edges of surfaces to be measured and marked.

An eyelet 50 may be formed within tape 18 at a location near end tab 46. Eyelet 50 permits a fastener 52 to be driven through tape 18. In this manner, tape measure 10 may be used to create arcuate or circular marks, as will be described more fully below in connection with FIG. 12.

Referring next to FIG. 2, bottom cover 16 includes a planar base 54 having a rearward end 56 and a forward end 58. L-shaped flanges 60 project upwardly from each side of planar base 54 and then project inwardly over base 54 to form longitudinal grooves 62. Flanges 60 terminate before reaching forward end 58 such that a ledge 64 is formed on base 54 near forward end 58.

A recessed track 66 is formed in housing 12 along a lower edge of each half 20 and 22 to slidably receive bottom cover 16. Each track 66 includes a groove 68 running parallel to bottom wall 34 that is sized and shaped to receive a horizontal portion 70 of L-shaped flanges 60. Recessed tracks 66 extend forward on housing 12 and terminate near front window cover 14. A recessed rail 72 is formed adjacent groove 68 to receive the L-shaped flanges 60 in slidable engagement. The exterior of flanges 60 and base 54 are preferably flush with the exterior of housing 12.

When bottom cover 16 is slidably engaged with housing 12, and slid to the most forward position, as shown in FIG. 1, the forward ends of the L-shaped flanges 60 will contact front window cover 14 to prevent further forward movement of bottom cover 16. In this position, ledge 64, which is located near forward end 58 of bottom cover 16, is preferably in flush contact against a bottom of front window cover 14. Thus, with bottom cover 16 located in its forward position, front window cover 14 and bottom cover 16 will coact to retain one another in slidable engagement with housing 12. Furthermore, the length of bottom cover 16 is shorter than the length of housing 12 so that as bottom cover 16 is slid rearwardly, until a rear end of the L-shaped flanges 60 contacts the rear portion of housing 12, ledge 64 will be slid out of engagement with front window cover 14 to permit front window cover 14 to be slid downward for removal, as will be described more fully below. With front window cover 14 removed, bottom cover 16 can then be slid forward and removed from housing 12.

Referring next to FIG. 3, front window cover 14 includes a forward wall 74 having a top edge 76 and a bottom edge 78. A pair of sidewalls 80 project rearwardly from forward wall 74 and a pair of inwardly projecting flanges 82 are formed on the ends thereof. A rectangularly shaped opening 84 or viewing window commences at bottom edge 78 and extends upwardly along forward wall 74. In the preferred embodiment, opening 84 extends approximately halfway up forward wall 74. A top flange 86 and two side flanges 88 project rearwardly from around the edges of opening 84. A pair of retainers 90 are positioned near the corners of forward wall 74 and sidewalls 80 at approximately the midpoint. Each retainer 90 has a rearwardly facing groove 92 formed therein that has an arcuate cross-sectional shape, the function of which will be described below.

As shown more clearly in FIG. 4, each of sidewalls 28 of housing 12 has a groove 94 positioned adjacent a front surface 96. Each groove 94 runs upwardly from bottom wall 34 and stops short of declining front face 38. Groove 94 is sized and shaped to slidably receive the inwardly projecting flanges 82 on front window cover 14. Declining front face 38 extends beyond front surface 96 to form a ledge 98 having a bottom surface 100 that is positioned generally orthogonally to front surface 96. Front and bottom surfaces 96 and 100 together define a compartment 102 having open sides, bottom, and front. When front window cover 14 is slidably received within grooves 94, top edge 76 will contact bottom surface 100 to enclose the sides and front of compartment 102.

The height of cover 14 is such that when it is fully received within grooves 94 and top edge 76 is contacting bottom surface 100, bottom edge 78 will be positioned above horizontal groove 68. This permits bottom cover 16 to slide forward until the L-shaped flanges 60 contact the inwardly projecting flanges 82 on front window cover 14. In this position, ledge 64 of bottom cover 16 encloses the bottom of compartment 102 and prevents exposure of compartment 102 to outside air.

Front surface 96 has a substantially rectangular-shaped opening 101 formed near bottom wall 34 through which flexible tape 18 projects. When front window cover 14 is fully received on housing 12, opening 84 in front window cover 14 is positioned over rectangular opening 102 in front surface 96 to permit tape 18 to pass therethrough.

Mounted within compartment 102 are a pair of markers 104, which preferably have a liquid-base. Each marker 104 includes a chisel-shaped marking tip 106 that is connected to a cylindrical reservoir 108. Each reservoir 108 in turn is attached to a mounting block 110 that is generally formed in the shape of a cube. As shown more clearly in FIG. 5, each mounting block 110 has a slot 112 formed therein for mounting to an actuator assembly 114. Actuator assembly 114 includes a plunger 116 and a helical compression spring 118. Plunger 116 has an elongate shaft 120 that includes plunger knob 42 and a lower plunger post 124. Positioned midway between plunger knob 42 and plunger post 124 is a rectangularly-shaped flange 126 that projects laterally outward on each side of shaft 120.

When actuator assembly 114 is mounted on housing 12, plunger knob 42 is positioned in recess 40 in the top of declining front face 38. Flange 126 is positioned below bottom surface 100 in compartment 102. Shaft 120 projects through an opening 128 formed in housing 12 and plunger post 124 projects through a second opening 130 formed by a pair of rectangular-shaped arms 132 that project outward from front surface 96.

Mounting blocks 110 are removably mounted on actuator assembly 114 by sliding the slots 112 in blocks 110 over flanges 126. Markers 104 are held in position by a pair of guides 134 formed on front surface 96. Guides 134 project outward from front surface 96 and have a groove 136 formed therein that has an arcuate cross-sectional shape. As such, guides 134 slidably coact with cylindrical marker reservoir 108 to prevent lateral movement of markers 104 while guiding markers 104 as markers 104 move longitudinally.

When front window cover 14 is slidably received on housing 12, retainers 90, which are positioned on the inside surface of front wall 74, coact with guides 134 to substantially enclose reservoir 108 to prevent any lateral movement, thus retaining mounting blocks 110 in engagement with flanges 126 on plunger shaft 120.

Helical compression spring 118 is slidably received over plunger post 124 and bears against the bottom surface of flange 126 and the upper surface of arms 132 to resiliently bias actuator assembly 114 upwardly in housing 12. In other words, the pair of markers 104 will be moved longitudinally upwards so that marking tips 106 are retracted within compartment 102, thereby, enabling bottom cover 16 to be slid forward. Markers 104 are moved longitudinally downward by a user pressing downward on plunger knob 42. Longitudinal movement of markers 104 is limited by contact between plunger knob 42 and housing 12.

Reference is now made to FIGS. 6A-6B, wherein markers 104 are shown in a retracted position. In this configuration, plunger knob 42 contacts a rim 138 that projects over recess 40. Downward movement of actuator assembly 114 is limited by contact between plunger knob 42 and the bottom surface of recess 40. Plunger knob 42 has a lip 140 projecting forward at the lower portion thereof. Lip 140 catches under a ledge 142 on the lower portion of recess 40 to hold actuator assembly 114 in a depressed configuration. Markers 104 are thus held in an extended configuration wherein the marker tips are in contact with the surface upon which housing 12 and flexible tape 18 are positioned. This is shown more clearly in FIGS. 7A-7B. Also shown in these figures is a standard locking mechanism 144 that prevents tape 18 from coiling and uncoiling. Locking mechanism 144 may include a sliding shaft 146 mounted to slide laterally within housing 12 and a contact member 148 that coacts with shaft 146 to be urged into contact with tape 18 when shaft 146 is moved from right to left, as shown in FIG. 7A. Inasmuch as these locking mechanisms are well known in the art, they will not be described in any detail.

In operation, the combination marker and tape measure 10 is positioned over a surface 150 to be marked. As shown in FIG. 7B, bottom cover 16 is slid rearwardly toward rear wall 32 until markers 104 are uncovered. With tape 18 uncoiled and placed in a desired location, plunger knob 42 is then depressed to move the pair of markers 104 from the retracted configuration, shown in FIGS. 6A-6B, to the extended configuration, shown in FIGS. 7A-7B, and cause a mark to be made on surface 150. Because the pair of markers 104 are positioned on either side of flexible tape 18, a mark will still be made on surface 150, even if tape 18 overlaps the edge of surface 150 or the width of surface 150 is less than the width of flexible tape 18.

If it is desired to mark a continuous line, plunger knob 42 can be urged forward to cause lip 140 to engage ledge 142 on housing 12 and retain actuator assembly 114 in a depressed state. To release actuator assembly 114, plunger knob 42 is urged rearwardly to disengage lip 140 from ledge 142 to allow spring 118 to urge actuator assembly 114 upward.

Replacement of markers 104 is conveniently done by sliding bottom cover 16 rearwardly until front window cover 14 can be slid downward and out of engagement with housing 12. Mounting blocks 112 are then slid off of flange 126 an replaced with new markers 104.

To facilitate positioning of markers 104 with marking indicia 44 on flexible tape 18, line indicators, arrows, or other indicia 216 can be placed on the exterior of front window cover 14 and/or on the interior of front window cover 14 adjacent to tape 18 generally along the same plane as markers 104. This facilitates alignment of markers 104 with a predetermined position on surface 150 to be marked as well as alignment of markers 104 with marking indicia 44 on flexible tape 18.

The rectangularly shaped opening 84 or viewing window enables a user of the combination marker and tape measure 10 to view precisely where markers 104 are located with respect to indicia 44 printed on flexible tape 18. To this end, indicia 216 may be placed on the outer sidewalls 80 of front window cover 14 and/or upon the inner sidewalls or flanges 88 of front window cover 14 which form the viewing window. As shown in FIG. 8, the viewing window in front window cover 14 may alternatively take the form of an oval-shaped opening 152. An oval-shaped opening 152 and indicia 44, as shown in FIG. 8, facilitates ease in matching the location of markers 104 with indicia 44.

Front window cover 14 may also be constructed of transparent plastic or other material that would allow visual alignment of markers 104 in compartment 102 with surface 150 or with marking indicia 44 on flexible tape 18.

Preferably, housing 12 is constructed of rigid, shock-resistant material such as aluminum or composite plastic. Markers 104 are preferably liquid-based, i.e., water, and colors may be used.

Figure 13:
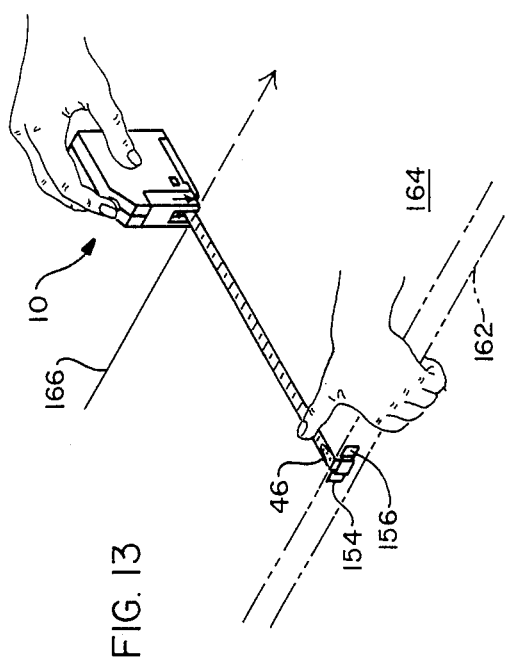
FIG. 13 is an isometric view of the tape measure and guide foot formed in accordance with the present invention as used to mark a line parallel to the edge of a surface.

As shown in FIG. 9, an optional guide foot 154 is shown having a substantially planar base 156 on which is formed a rectangular-shaped housing 158 with an internal bore 160 having a substantially rectangular cross-sectional shape. Bore 160 is sized and shaped to be slidably received over lip 48 on end tab 46 of flexible tape 18. As shown in FIG. 13, guide foot 154 is mounted to end tab 46 so that base 156 bears against edge 162 of a surface 164 to be marked. Thus positioned, tape measure 10 may then be slid along surface 164 to mark a line 166 that is substantially parallel to edge 162 of surface 164.

Referring again to FIG. 9, guide foot 154 may be stored on rear wall 32 of housing 12 by sliding base 156 into a pair of L-shaped flanges 168. Ideally, an interference fit with guide foot 154 is formed between flanges 168 and rear wall 32 to prevent guide foot 154 from unintentionally sliding out or off of housing 12.

FIG. 10 illustrates an alternative embodiment for the actuator assembly wherein a plunger 170 is constructed to have a substantially triangularly-shaped flange 172 positioned longitudinally between plunger post 174 and upper portion of shaft 176. A locking mechanism 178 is attached near the apex 180 of flange 172 for locking flexible tape 18 to prevent tape 18 from coiling and/or uncoiling.

Locking mechanism 178 includes a rod 182 having an upper end 184 attached to apex 180 of flange 172 and a lower end 186 attached to a foot 188. Foot 188 has a substantially flat top surface and an outwardly-curved bottom surface 192. A notch 194 is formed in bottom surface 192 as shown.

Each of markers 196, shown in FIG. 10, have modified mounting blocks 198 attached to the top of marker reservoir housing 200. Mounting blocks 198 include slots 202 that facilitate slidable engagement of mounting blocks 198 with flange 172. In addition, mounting blocks 198 have a lower portion 204 constructed of a pair of legs 206 that are joined together at one end to form a horizontally oriented V-shape. One leg is attached to reservoir housing 200 and the other leg is attached to mounting block 198. When markers 196 are subjected to a compressive force, legs 206 bend together to absorb the shock. In other words, lower portion 204 of mounting blocks 198 compresses to prevent excessive force being applied to marker tips 208.

Locking mechanism 178 is of a shorter length than markers 196 such that initial downward movement of actuator assembly 170 causes marker tips 208 to contact a surface to be marked before locking foot 188 contacts flexible tape 18. Further depression of plunger 170 causes legs 206 on mounting blocks 198 to bend together to prevent damage to marker tips 208 as locking foot 188 is brought into engagement with flexible tape 18.

An alternative embodiment of plunger 170, as illustrated in FIG. 10, can be used to lock tape 18 without marking a surface. To do this, bottom cover 16 is modified, as shown in FIG. 11, wherein ledge 210 has a pair of indentations 212 formed therein that are positioned below marker tips 208 when cover 16 is slid forward on housing 12. Damage to marker tips 208 is prevented because of the compression of mounting blocks 198 as well as the additional room provided by indentations 212 in bottom cover 16.

Figure 12:
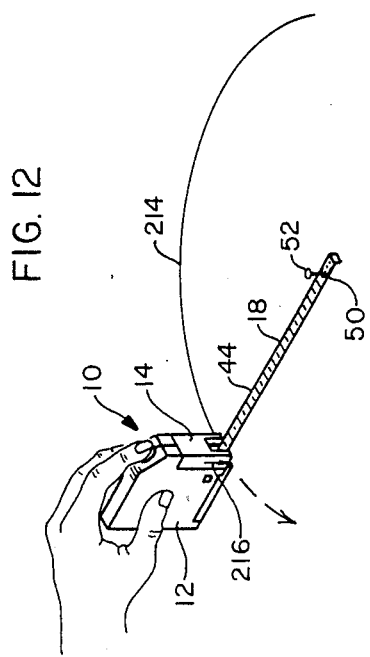
FIG. 12 is an isometric view illustrating the operation of the tape measure to form an arcuate or circular mark.

FIG. 12 illustrates the use of the combination marker and tape measure 10 to form an arcuate line 214. Fastener 52 is placed through eyelet 50, as was previously described when discussing FIG. 1. Tape 18 is then uncoiled by pulling housing 12 away from fastener 52 until a desired radius is obtained, as indicated by the alignment of marking indicia 216 on front window cover 14 with marking indicia 44 on flexible tape 18. The plunger is then depressed to cause the markers to move to the extended configuration and tape 18 is then rotated about fastener 52 to mark line 214.

The means and construction disclosed herein are by way of example and comprise primarily the preferred form of putting the invention into effect. Although the drawings depict a preferred and alternative embodiment of the invention, other embodiments have been described within the preceding text. One skilled in the art will appreciate that the disclosed device may have a wide variety of shapes and configurations. Additionally, persons skilled in the art to which the invention pertains might consider the foregoing teachings in making various modifications, other embodiments, and alternative forms of the invention.

It is, therefore, to be understood that the invention is not limited to the particular embodiments or specific features shown herein. To the contrary, the inventor claims the invention in all of its forms, including all alternatives, modifications, equivalents, and alternative embodiments which fall within the legitimate and valid scope of the appended claims, appropriately interpreted under the Doctrine of Equivalents.

INDUSTRIAL APPLICABILITY

The present invention is a combination marker and tape measure having: a housing defining an interior chamber; a retractable, flexible measuring tape located within the interior chamber and capable of extension and retraction therefrom; a pair of markers mounted to the housing for marking a surface on opposite sides of the extended measuring tape; and a front window cover and a bottom cover which enclose the markers when not in use, the front window cover having indicia thereon for easy alignment of the markers to a desired measurement. The present invention permits precise marking on both sides of the measuring tape, even in very close quarters, without scaring or marking side surfaces. A locking mechanism may also be engaged to temporarily prevent further retraction or extension of the flexible tape from the interior chamber. The measuring tape may be provided with an eyelet through which a fastener may pass, thereby enabling the device to create arcuate or circular marks. The measuring tape may also be provided with an optional guide foot which is attached to a terminal end of the tape. When so attached, the guide foot is placed against the edge of a surface to be marked, and the measuring tape is moved along the surface, thereby, creating a mark which is substantially parallel to the edge of the surface.

The apparatus of this invention is very durable in design, is easily constructed, is inexpensive and economical to manufacture, and is extremely simple to use.

I claim:

1. A combination marker and tape measure comprising:
   (a) a housing having a pair of sidewalls, a front wall, a back wall, a top wall, and a bottom wall;
   (b) a flexible tape mounted inside said housing, said tape having incremental indicia thereon for measuring distances;
   (c) a pair of markers mounted on said front wall, one marker being positioned adjacent to each edge of said flexible tape, said markers being mounted to move between a retracted position, wherein each of said markers is positioned above a plane of said tape, which as been extracted from within said housing and an extended position, wherein each of said markers projects below said plane of said tape to contact a surface on which said tape is placed;
   (d) an actuator member mounted on a forward edge of said top wall for moving each of said markers between said retracted and extended positions;
   (e) a front window cover removably mounted on said front wall to cover said pair of markers; and
   (f) a bottom cover slidably mounted on said housing to slide between a forward position, wherein said bottom cover is slid into contact with said front window cover to enclose said pair of markers, and a rearward position, wherein said bottom cover is moved out of contact with said front window cover to expose said pair of markers such that said pair of markers can move to said extended position and mark a surface upon which said tape is placed.

2. The tape measure of claim 1, wherein said actuator member is manually actuated to move said pair of markers between said retracted and extended positions.

3. The tape measure of claim 2, wherein said actuator member is resiliently biased to hold said pair of markers in said retracted position.

4. The tape measure of claim 1, wherein said front window cover is transparent to permit visual alignment of said pair of markers with said incremental measuring marks on said flexible tape.

5. The tape measure of claim 1, wherein said front window cover further includes one or more indicia for indicating a position of said pair of markers relative to said incremental measuring marks on said flexible tape.

6. The tape measure of claim 1, wherein said flexible tape is coiled inside said housing to be extended or retracted through an opening in said housing, and further including means for locking said flexible tape at a preselected position with respect to said housing to temporarily prevent said flexible tape from being further extended or retracted.

7. The tape measure of claim 6, wherein said locking means is connected to said actuator member such that when said pair of markers are moved to said extended position by said actuator member, said locking means engages said flexible tape to lock said flexible tape with respect to said housing to temporarily prevent further extension or retraction of said flexible tape.

8. A combination marker and tape measure comprising:
   (a) a housing having a pair of opposed sidewalls, a front wall, a rear wall, a top wall, and a bottom wall, said walls defining an interior chamber, said housing further having a compartment formed in said front wall;
   (b) a flexible tape mounted to said housing within said interior chamber, said flexible tape being resiliently coiled to retract within said interior chamber, said tape including incremental measuring marks located thereon for measuring distances;
   (c) a pair of markers having an integral liquid reservoir, said pair of markers being mounted to said housing within said compartment, one marker being positioned adjacent an edge of said flexible tape;
   (d) an actuator member mounted on said front wall within said compartment, said actuator member having said pair of markers slidably mounted thereon, said actuator member being manually actuated to move said pair of markers between an extended position, wherein each of said markers projects below a plane of said tape which has been extracted from within said housing to contact a surface upon which said tape is placed, and a retracted position, wherein each of said markers is positioned above said plane of said tape which has been extracted from within said housing
   (e) a front window cover removably mounted on said front wall to cover a front and sides of said compartment; and
   (f) a bottom cover slidably mounted on said housing to move between a forward position, wherein said bottom cover contacts said front window cover to enclose said pair of markers within said compartment to prevent said markers from being exposed to outside air, and a rearward position, wherein said bottom cover is slid toward said rear wall to expose said pair of markers and permit said pair of markers to move to said extended position and project from said housing below said plane of said tape.

9. The tape measure of claim 8, further including a pair of guides formed on said front wall that are sized and shaped to slidably receive said pair of markers to maintain said pair of markers in slidable engagement with said actuator member.

10. The tape measure of claim 9, wherein said front window cover further includes retaining members that are positioned to engage said guides on said front wall when said front window cover is mounted on said housing to further maintain said pair of markers in slidable engagement with said actuator member.

11. The tape measure of claim 10, wherein said front window cover further includes indicia for indicating a position of said pair of markers relative to said incremental measuring marks on said flexible tape.

12. The tape measure of claim 10, wherein said front window cover is transparent to permit visual alignment of said pair of markers with said incremental measuring marks on said flexible tape.

13. The tape measure of claim 10, wherein said actuator member further includes a spring member for biasing said actuator member and said pair of markers in said retracted position.

14. The tape measure of claim 10, wherein said bottom cover is indented in an area beneath said pair of markers when said bottom cover is in said forward position, said indents preventing crushing of said pair of markers on said bottom cover when said actuator member is actuated to move said pair of markers into said extended position.

15. The tape measure of claim 10, further including means for locking said flexible tape to temporarily prevent undesired extension and retraction of said flexible tape.

16. The tape measure of claim 15, wherein said locking means is coupled to said actuator member such that when said actuator member is actuated to move said pair of markers into said extended position, said locking means engages said flexible tape to temporarily prevent further coiling or uncoiling of said flexible tape.

17. The tape measure of claim 15, wherein said locking means comprises a foot member coupled to said actuator member and positioned to contact said flexible tape after said pair of markers move to said extended position.

18. The tape measure of claim 17, wherein said pair of markers are resiliently mounted on said actuator member to absorb a force exerted by said actuator member as said actuator member moves said foot member into contact with said flexible tape.

* * * * *